J. GEISTDÖRFER.
APPARATUS FOR EXTRACTING ALBUMINS FROM PLANTS.
APPLICATION FILED DEC. 24, 1909.
1,003,594.
Patented Sept. 19, 1911.
2 SHEETS—SHEET 2.
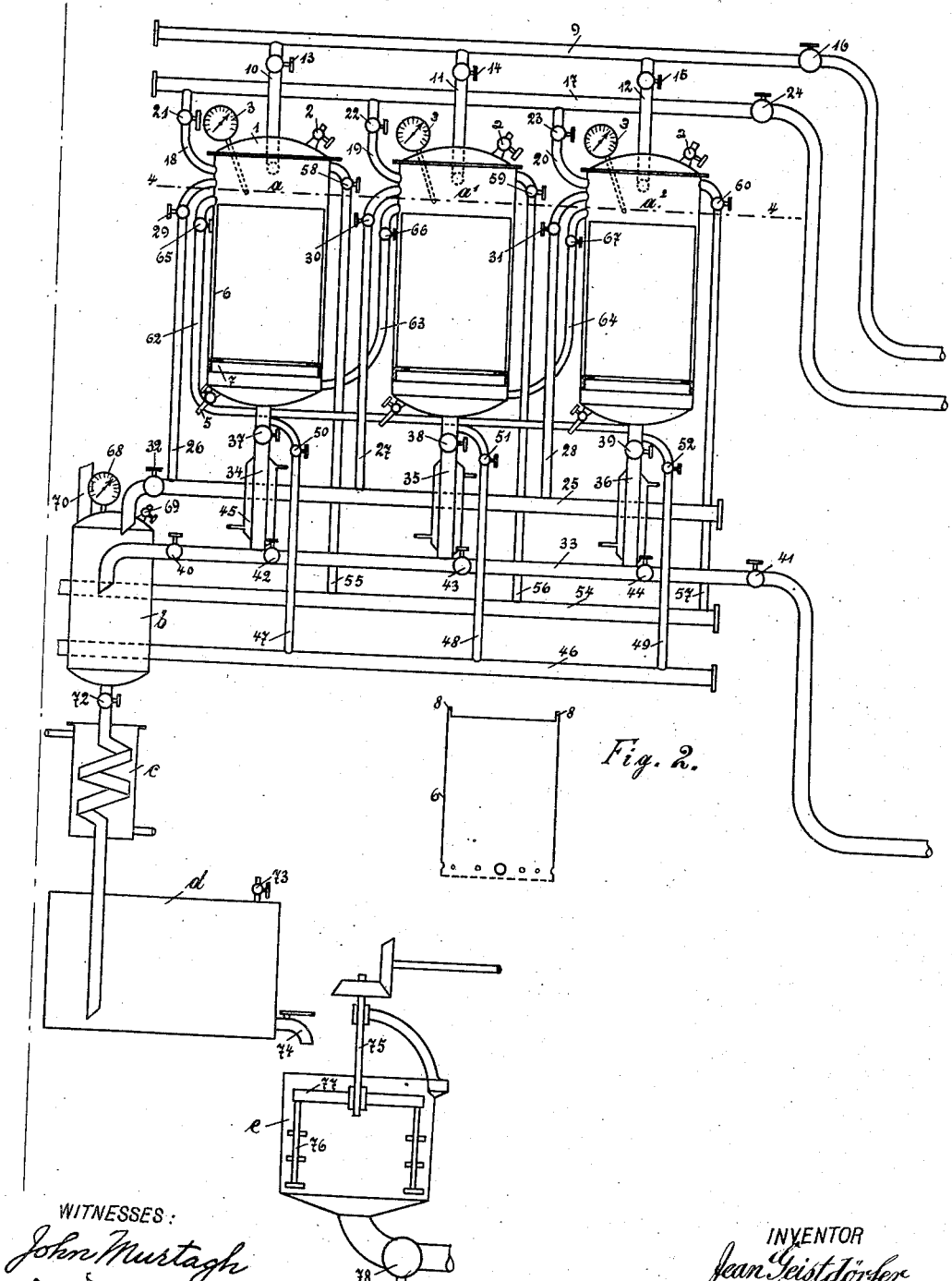
WITNESSES:
John Murtagh
L. J. Murphy
INVENTOR
Jean Geistdörfer
BY
ATTORNEYS.

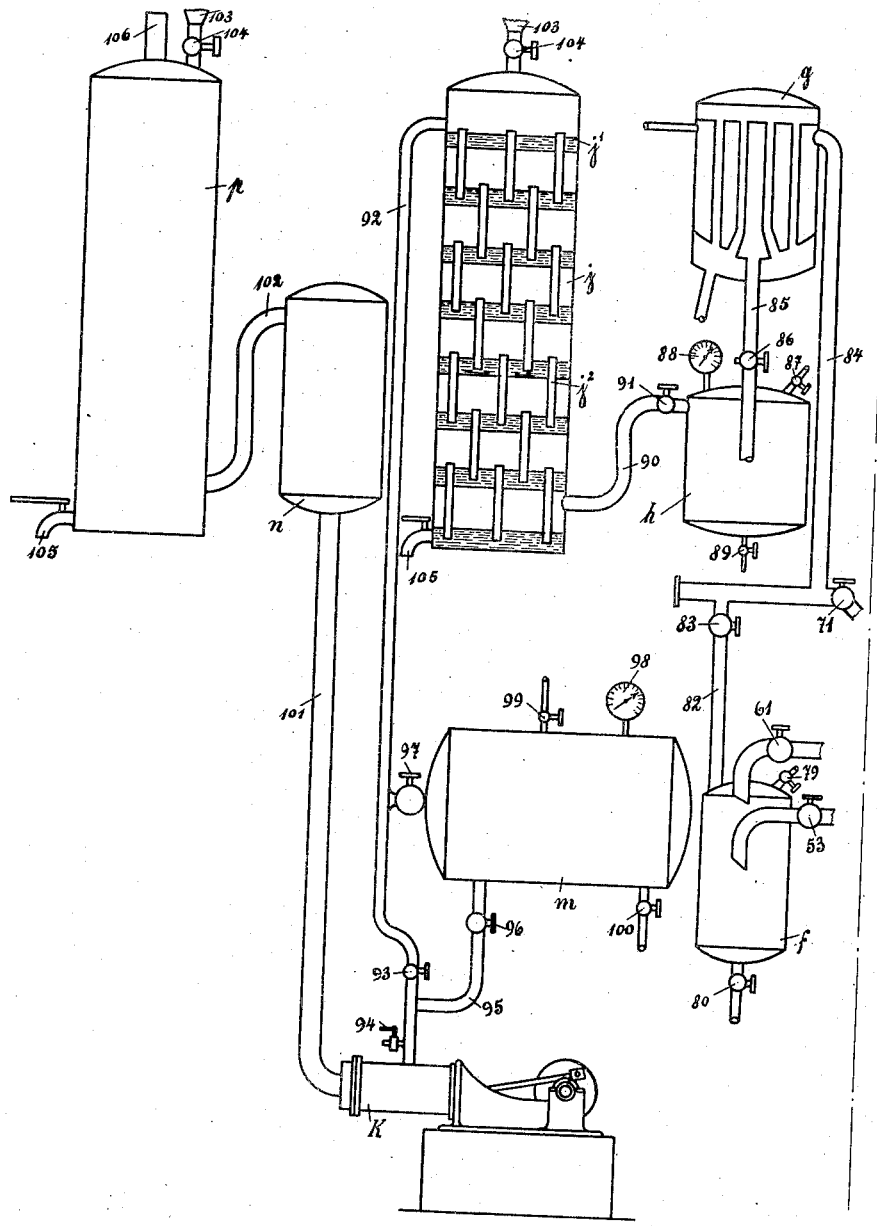

UNITED STATES PATENT OFFICE.

JEAN GEISTDÖRFER, OF PARIS, FRANCE.

APPARATUS FOR EXTRACTING ALBUMINS FROM PLANTS.

1,003,594. Specification of Letters Patent. Patented Sept. 19, 1911.

Application filed December 24, 1909. Serial No. 534,795.

*To all whom it may concern:*

Be it known that I, JEAN GEISTDÖRFER, a citizen of the French Republic, and residing at Paris, France, have invented certain new and useful Improvements in Apparatus for Extracting Albumins from Plants, of which the following is a specification.

My invention relates to the extraction of albumins from plants, and apparatus therefor.

Vegetable albumins, particularly of cereals and certain legumes, soluble in alcohol are known and are designated as gluten-fibrine, zein, gliadin, vegetable casein, conglutin, maisin, and so on. The same are obtained in the laboratory by lixiviating the raw material in question with alcohol heated to 50° to 90° C. The albumin is then precipitated from the alcoholic solution with ether, absolute alcohol, excess of water or dilute acids. Technically the production offers great difficulties, firstly, with regard to the recovery of the alcohol, and, secondly, with regard to obtaining a precipitate which can be readily collected, washed, dried and purified containing no alcohol, and not agglomerating into a sticky mass.

An important object of my invention is to provide a commercial process for obtaining from vegetable matter albumin soluble in alcohol and in the form of a solid mass.

My process completely overcomes the above mentioned difficulties and comprises two principal operations:—Firstly, the extraction of the albumin by means of hot alcohol with the aid of a vacuum which assures complete lixiviation and almost complete recovery of the alcohol, and excludes all danger of fire; secondly, the precipitation of the albumin while in motion, not alone with the aid of water, ether, absolute alcohol and dilute acids, as is already known, but also with other than the mentioned precipitants, such as glycerin, oils, tetrachlorid of carbon, turpentine, with or without the admixture of strong acids, or other suitable liquids.

My process necessitates the employment of two apparatuses, firstly a lixiviating device working with the aid of a vacuum, and secondly a precipitating pan for precipitation in motion provided with an agitator having a vertical axis. The centrifuging, drying and disintegration have nothing peculiar about them or are well-known operations and are not further described herein.

As starting materials I may employ the most various disintegrated or ground cereals, as, *e. g.* barley, maize, wheat, rice, manick, soja, and so on; also, the various legumes; further, commercial residues of albiminous materials from malt houses and breweries, starch, glucose and dextrin works; waste from rice, flour, bran, and so on; lastly, in addition, oil cake, earth nuts, and so on.

In order that my invention may be clearly understood I will now explain the same with reference to the accompanying drawing in which apparatus suitable for carrying my process into practice is represented by way of example.

In said drawing: Figures 1 and 1ª are diagrammatic elevations, partly in section, and Fig. 2 is a detail.

Referring to the drawing, the lixiviating apparatus comprises a plurality of individual leaching-vats, of which three are represented and designated $a$, $a^1$ and $a^2$, but the number may be optional. Each of these vats has a removable lid 1 normally closed airtight, an air-inlet cock 2 and a thermometer 3. In addition each vat has a water-gage, not shown in the drawing, admitting of the level 4 of the liquid within being observed, and also a discharge cock 5 for withdrawing tests. The lids are secured by hinged screws, not shown, a packing of caoutchouc or other suitable material, also not shown, being placed under them. In each vat is a sheet-iron cylinder or drum 6 having a perforated bottom covered with a sieve, in which is located the substance to be lixiviated. Each drum rests on a circular angle-iron 7 riveted to the wall of the vat. Each drum has two handles 8, as shown in Fig. 2, allowing them to be handled more easily. The walls of the vats may be doubled for heating the mass which is to be lixiviated by passing steam between the same.

9 designates a common alcohol vapor pipe connected with the vats by pipes 10, 11 and 12 having cocks 13, 14 and 15, respectively.

16 is a shut-off cock.

17 is a common steam pipe connected with the vats by pipes 18, 19 and 20 having cocks 21, 22 and 23, respectively.

24 designates a shut-off cock.

25 is a common vacuum pipe connected with the vats by pipes 26, 27 and 28 having cocks 29, 30 and 31, respectively.

32 designates a shut-off cock.

33 is a common alcohol pipe connected with the vats by pipes 34, 35 and 36 having cocks 37, 38 and 39, respectively; 40 and 41 designate shut-off cocks; 42, 43 and 44 are cocks which regulate the circulation between the vats. Said pipes 34, 35 and 36 are incased with a jacket 45 into which steam may be passed for heating the alcohol.

46 designates a common condensed-water pipe with which the vats are connected by pipes 47, 48 and 49 having cocks 50, 51 and 52, respectively.

53 designates a shut-off cock.

54 is a common vacuum pipe corresponding to the pipe 25 which works just like this and is connected with the vats by pipes 55, 56 and 57 having cocks 58, 59 and 60, respectively. 61 designates a shut-off cock. Said pipe 54 is optional. The vats are interconnected by pipes 62, 63 and 64 having cocks 65, 66 and 67, respectively.

$b$ designates a vacuum receiver or pan having a manometer 68 and an air-inlet cock 69. In open relation with this pan is a pipe 70 having a shut-off cock 71. In addition said pan has a water-gage not represented in the drawing. By means of the discharge cock 72 the liquid can be run from pan $b$ into the cooler $c$ and storage tank $d$ having air-admission cock 73 and bib-cock 74.

$e$ designates a pan for precipitation while the liquid is in motion having a vertical axle 75. Agitating arms 76 are secured on the cross arm 77 secured to axle 75.

78 designates a shut-off cock in the pipe connecting pan $e$ with the centrifuges or cylinder presses not shown in the drawing.

$f$ designates a suction tank for steam and condensed water having an air-inlet cock 79 and a discharge cock 80.

82 is a suction pipe having cock 83. A water-gage, not shown, admits of the height of the liquid in tank $f$ being observed. (The pan $b$ cannot be used here as the condensed water would precipitate the albumin which would stop up the pipes.)

84 designates a pipe connecting pan $b$ and tank $f$ with the condenser $g$.

85 designates a pipe connecting condenser $g$ with the receiver or tank $h$ for condensed alcohol.

86 designates a shut-off cock and 87 an air-inlet cock.

88 is a manometer and 89 a discharge cock.

90 designates a suction pipe connecting the washing tower $j$ with receiver $h$. 91 is a shut-off cock in the latter pipe.

92 is a suction pipe leading to the vacuum pump K.

93 and 94 are air-inlet cocks.

$m$ designates a common vacuum receiver connected with the vacuum pump by pipe 95 having the cock 96 and with suction pipe 92 by way of cock 97. This receiver has a vacuum gage 98.

99 is an inlet cock for admitting hot air or steam, and 100 is a discharge cock.

101 is a discharge pipe and $n$ a pan or cistern connected with the washing tower $p$ by pipe 102. The towers $j$ and $p$ are alike and comprise individual plates $j'$ provided with overflows $j^2$. Consequently water always remains on these plates at a definite height and the alcohol vapors which are sucked in or are returning are condensed in it.

103 designates a hopper having a shut-off cock 104.

105 designates a bib-cock and 106 a pipe for discharging non-condensed gases and vapors.

The principle on which my apparatus operates is as follows:—The alcohol which is charged most completely with albumins is brought together with the substance richest in albumin, i. e. that freshly charged in, and the alcohol charged least with albumins with the substance most lixiviated. The liquid of each individual extraction passes on by itself separately in such manner that, before the alcohol or the alcoholic albumin solution is sent from one vat into the next, the alcohol which is in this latter vat is allowed to flow into the following one. In addition, the alcohol circulates, when passing through each individual vat, through the mass to be lixiviated in succession from below upward and from above downward. This has the advantage, as compared with the diffusion process, that the lixiviation is better and more rapid and a more concentrated solution is obtained. The employment of a vacuum prevents the alcohol vapors spreading in the space or chamber in question and thus removes all danger of fire.

Referring now to the drawing, after the vats or extractors $a$, $a^1$ and $a^2$ have been charged and all the cocks have been closed, a vacuum is produced in the entire apparatus. For this purpose, cocks 96, 97, 91, 86, 71, 83, 32, 29, 30, 31 are opened and pump K is set working. When the manometer indicates a pressure below atmospheric of 650 to 700 mm. mercury, cocks 83 and 96 are closed and cock 94 is opened. The pump may then be stopped. Then cocks 29, 30 and 31 are closed again. When the condenser $g$ is cooled and the alcohol heated to the required temperature, the alcohol is allowed to enter into extractor $a$ by opening cocks 41, 42, 43 and 44 and finally 37.

Under the influence of the vacuum alcohol flows through pipe 33 and rises in pipe 34. When the level 4 is reached cocks 37, 42, 43, 44 and 41 are closed and the apparatus is left alone for five or ten minutes. When working normally, during this time the alcohol charged with albumin is allowed to pass from vat $a^1$ into vat $a^2$, and a vacuum is produced in that extractor which is freshly charged or in suction tank $f$ and receiver $m$. The alcohol charged with albumins is then allowed to pass from vat $a$ into vat $a^1$, by opening cocks 40, 42, 38 and 66. By opening cocks 16 and 13, alcohol vapors are simultaneously allowed to enter into extractor $a$ so that the vacuum produced therein does not prevent the discharge. This alcohol vapor simultaneously heats the solvent alcohol. Instead of doing this, however, cock 29 may be opened in order to equalize the pressure below and above in the extractor, or air-inlet cock 2 may be opened. The alcoholic extract from extractor $a$ passes through pipe 63 to extractor $a^1$, and when the level in extractor $a$ has sunk one half, cocks 66, 40, 42, 16 and 13 are closed. The mass contained in extractor $a^1$ is now saturated with alcohol and the alcoholic albumin-solution has not yet been able to enter into the pipe 33; then alcohol is allowed to pass from extractor $a$ to extractor $a^1$ in the reverse direction without the aid of pipe 63, by opening in succession cocks 32, 30, 38, 42, 37 and subsequently cocks 16 and 13. The albumin solution which remained in extractor $a$ passes through pipes 34, 33, 35 and rises into extractor $a^1$. Simultaneously alcohol vapor flows through pipes 9 and 10 into extractor $a$, then through the mass saturated with alcohol in extractor $a^1$ and partially condenses there and heats the same. The vapor not condensed in extractor $a^1$ passes to the condenser $g$ through pipes 27 and 25, vacuum receiver $b$, pipes 70 and 84, and the condensed alcohol flows thence into tank $h$, from which it is drawn off from time to time to supply it again to the system. The alcohol vapors not retained by the condenser pass to tower $j$ which retains them, but in the event of traces of alcohol passing thence they are stopped by tower $p$. In order to heat the alcohol circulating from extractor $a$ to extractor $a^1$ steam is preferably passed around pipes 34 and 35. When the alcohol flows away only badly from the mass contained in extractor $a$, cocks 16 and 13 are closed and air-inlet cock 2 of extractor $a$ is opened, while the pump constantly sucks away as much alcohol as possible from extractor $a$. When the level 4 has been reached in extractor $a^1$ and when extractor $a$ contains hardly any liquid, cocks 30, 2, 38, 42 and 37 are closed. Instead of pipe 25 pipe 54 may be used or both jointly.

The mass in extractor $a$ is not yet fully lixiviated. Consequently alcohol is afresh sent into the extractor in the manner above described. The solution which is noticeably concentrated with albumins is allowed then to pass from extractor $a^1$ to extractor $a^2$ and, lastly, that from extractor $a$ to extractor $a^1$, as above described. The material contained in extractor $a$ may then be considered as lixiviated. This can be determined by taking a test from extractor $a$ by means of cock 5 and then precipitating with acidified water. In order to expel the alcohol contained in the mass in extractor $a$, a current of hot air or steam is sent through cocks 53, 50, 24 and 21, the other cocks remaining closed. The alcohol or alcohol-water vapors condense in suction tank $f$ where the vacuum is produced. Vacuum tank $b$ cannot be employed for this as the water would precipitate the albumins which might cause the pipes to be stopped up.

The liquid condensed in tank $f$ is discharged, before a fresh vacuum is produced, by closing cocks 71, 86 and opening cocks 79, 80. The diluted alcohol is conducted into a common tank or collector for weak alcohol, into which are sent, in addition, the liquids discharged by the centrifuges or presses. This alcohol is subsequently concentrated by distillation and returned to the system. In this manner almost the entire alcohol is recovered which saturated the mass to be lixiviated and which cannot be recovered solely by suction.

Cocks 53, 50, 24, 21 are then closed and then lid 1 is removed from extractor $a$, the drum 6 is emptied, charged afresh, reinserted and the lid secured. Then a vacuum is produced in extractor $a$ as previously described. In extractor $a^2$ the albumin solution is sufficiently concentrated. It is drawn off by opening cocks 40, 39 and the air-inlet cock 2 of extractor $a^2$. The liquid flows away through pipes 36, 33 into vacuum pan $b$. The same is sent into tank $d$ by closing cocks 40, 71 and opening cocks 69, 72, 73. The apparatus is then working normally, $i. e.$ when extractor $a^1$ is two-thirds lixiviated, extractor $a^2$ one-third and extractor $a$ charged with fresh raw material. Then pure alcohol is sent into extractor $a^1$, thence into extractor $a^2$ and finally into extractor $a$, whence it is drawn off. When extractor $a^1$ may be considered lixiviated, it is emptied, charged afresh, evacuated, and so on. The cycle of operations remains the same however large the number of extractors may be. The mode of operation of towers $j$ and $p$ does not require to be more particularly explained; they may be substituted by any other suitable system. In the event of alcohol condensing in receiver $m$, a current of hot air or steam is sent through cock 99, and the condensed liquid is collected in the collector, not represented in the drawing, for weak alcohol together with the diluted alcohol coming from the tank $f$.

The vacuum receiver $m$ is not absolutely necessary as the vacuum can be produced without its aid by closing cocks 96 and 97 and opening 93. But as it has a large capacity it enables the vacuum to be maintained without the pump working continuously. For this purpose a vacuum is produced in receiver *m* by closing cocks 97, 93 and opening cock 96. When the vacuum 740 mm. of mercury is obtained, cock 96 is closed and the pump is stopped. In the event of the pressure in the apparatus having to be increased, it is sufficient to open cock 97 to again bring about the normal operating pressure in the apparatus. Receiver *m* can be subsequently evacuated afresh and operations may proceed in like manner.

In order to produce a vacuum in a freshly-charged extractor it is advantageous to produce the vacuum directly by cutting out receiver *m* and opening cock 93. Receiver *m* is, however, a convenient auxiliary for rapidly equalizing a small admission of air without starting the pump.

As the two described modes of operation are independent of one another, they may be employed simultaneously.

The condensation of the alcohol vapor in condenser *g* produces in itself a certain vacuum, and consequently the apparatus can work for a certain time with this condensation without the pressure rising. It suffices to close cock 91 and observe manometer 88. When large quantities of air enter the apparatus, the vacuum must of course be produced by the pump.

The albumin solution contained in vacuum pan *b* passes into cooler *c* which cools it, and then into tank *d*. When the precipitation pan *e* is filled to a certain height, exactly indicated by a mark on the wall, with as much water or other suitable liquid, such as dilute acids, glycerin or the like, as is necessary for precipitating a definite volume of the albumin solution, the agitator is set working. Cocks 73 and 74 are then opened quite gradually in order to allow the albumin solution to flow into the liquid contained in pan *e* up to a second marked point which indicates the volume which can be precipitated by the liquid contained in the precipitation pan. Under these conditions the albumins are obtained as firm flakes, and not as a viscous mass, which do not agglomerate and contain little alcohol. While the agitator remains in motion, cocks 73 and 74 are closed and cock 78 is opened. The liquid passes thence directly into the centrifuges or into the filter presses. It may, however, be collected in a tank and allowed to stand.

After 15 to 20 minutes the precipitated albumin settles, so that it can be readily separated from the liquid over it. It is liberated in optional manner from the adhering liquid and then it has only to be dried, pulverized, and so on. The precipitated mass may also be pressed into any optional shape, drawn into threads, rolled into leaves or sheets, alone or in combination with other suitable substances. The waste liquid is conducted into the above mentioned collector for dilute alcohol in order to be concentrated by distillation and then supplied again to the system.

The albumin solution may also be precipitated as follows: Instead of precipitating the albumins by agitation in water, as described above, I may simply dilute the alcohol and place the solution in a vacuum, the alcohol vapors being sucked off by vacuum and condensed. By this process the alcohol is completely recovered on the one hand, and the product is obtained dry on the other hand.

My improved process and the hereindescribed apparatus may serve, without material modification, for the extraction of albumins which are insoluble in alkalis but soluble in weak alkaline lyes, and also for lixiviating all other substances by means of optional solvents, for example for the lixiviation of bark for the purpose of manufacturing tannin extract, for the extraction of fatty substances by means of tetrachlorid of carbon, and the like.

It is to be understood that the details of the hereindescribed mode of operation as well as the construction of the apparatus may be modified within certain limits without departing from the spirit and scope of my invention.

I claim:

1. In extracting apparatus of the character described, the combination, with a plurality of vats, of pipes, each provided with a cock, interconnecting said vats one with another, a vacuum tank, a common vacuum pipe connected with said tank, pipes, each having a cock, connecting said vacuum pipe with the upper portions of said vats, a common circulation pipe, having a cock, connected with said tank, and pipes, each having a cock, connecting said circulation pipe with the lower portions of said vats; a common alcohol-vapor pipe having a cock, and pipes, each having a cock, connecting said alcohol-vapor pipe with the top portions of said vats; a second suction tank; and pipes, each having a cock, connecting said second tank with the bottom portions of said vats, for the purpose specified.

2. In extracting apparatus of the character described, the combination, with a plurality of vats, of pipes, each provided with a cock, interconnecting said vats one with another, a vacuum tank, a common vacuum pipe connected with said tank, pipes, each having a cock, connecting said vacuum pipe with the upper portions of said vats, a common circulation pipe, having a cock, connected with said tank, and pipes, each having a cock, connecting said circulation pipe with the lower portions of said vats; a common alcohol-vapor pipe having a cock, and pipes, each having a cock, connecting said alcohol-vapor pipe with the top portions of said vats; a second suction tank; pipes, each having a cock, connecting the top portions of said vats with said second tank, and pipes, each having a cock, connecting said second tank with the bottom portions of said vats, for the purpose specified.

In testimony whereof, I affix my signature in the presence of the witnesses.

JEAN GEISTDÖRFER.

Witnesses:
　DEAN B. MASON,
　FRED. GRAFTON,
　ERNEST MOHR.